Feb. 24, 1970   E. E. HESTON   3,496,600
BLOW MOLDING MACHINE
Filed April 3, 1967

INVENTOR
EUGENE E. HESTON

BY
Oberlin, Maky, Donnelly & Renner
ATTORNEYS

United States Patent Office 3,496,600
Patented Feb. 24, 1970

3,496,600
BLOW MOLDING MACHINE
Eugene E. Heston, Akron, Ohio, assignor, by mesne assignments, to NRM Corporation, a corporation of Ohio
Filed Apr. 3, 1967, Ser. No. 628,009
Int. Cl. B29c
U.S. Cl. 18—5
10 Claims

ABSTRACT OF THE DISCLOSURE

A molding machine having a plurality of molds mounted on a conveying mechanism for limited relative movement to permit interruption of the movement of the molds at any one of a plurality of stations during continued movement of the conveying mechanism.

---

The present invention relates generally, as indicated, to a blow molding machine and, more particularly, to certain improvements in blow molding machines for use in the continuous manufacture of hollow articles from plastic material.

One type of blow molding machine in widespread use includes a horizontal or vertical rotating table or other such conveying mechanism on which there are mounted a plurality of molds for intermittently indexing the molds one at a time to a single parison extruder. However, a considerable amount of time is lost stopping and starting the entire mass of the indexing mechanism as each mold is successively brought into alignment with the parison extruder to permit placement of the parisons in the molds and subsequent clamping and expansion of the parisons to the shape of the mold cavity.

There are presently available blow molding machines in which the conveying mechanism and molds supported thereby are continuously driven, but this necessitates that the speed at which the molds move be carefully synchronized with rate of lineal movement of the parisons to effect the proper placement of the parisons in the molds.

It is therefore a principal object of this invention to provide a blow molding machine of the type generally discussed above, but in which the movement of each mold is temporarily halted at the same location to permit parison placement and closing of the molds while the substantial mass of the conveying mechanism continues to move, whereby no time is lost starting and stopping the conveying mechanism and all of the molds may be held in direct alignment with the parison extruder during placement of the parisons therein.

Another object is to provide such a blow molding machine with novel means for mounting the molds on the conveying mechanism to permit such continued movement of the conveying mechanism while momentarily halting the movement of the molds.

A further object is to provide such a blow molding machine with novel means for opening and closing the molds both while the molds are stationary and the conveying mechanism is moving, and while the molds are moving with the conveying mechanism.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

Figure 1:
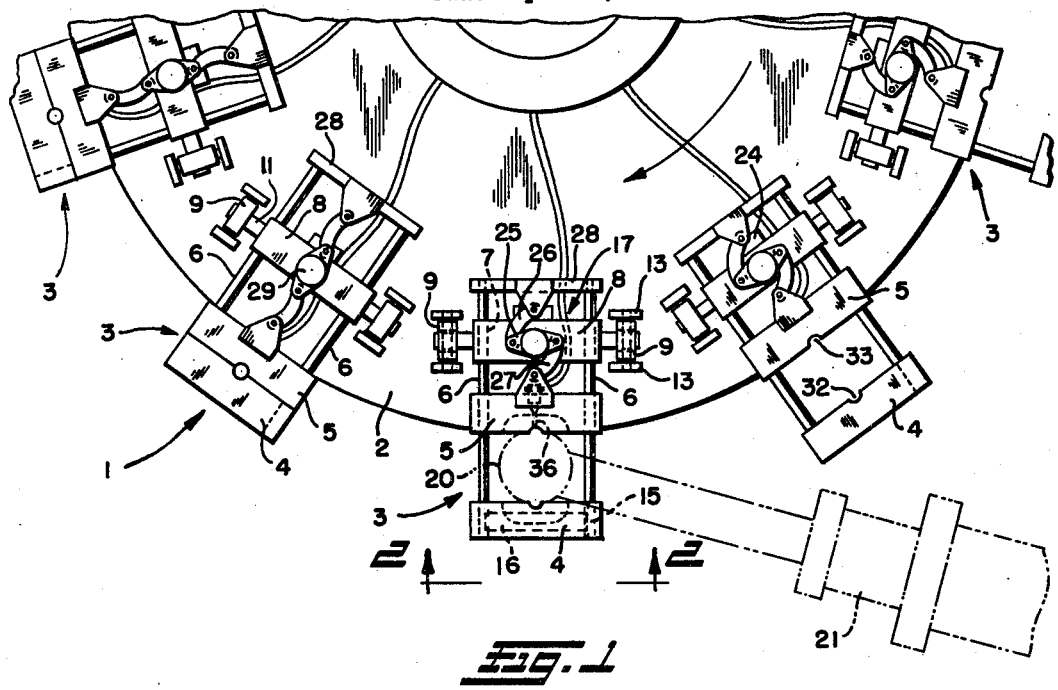
Figure 2:
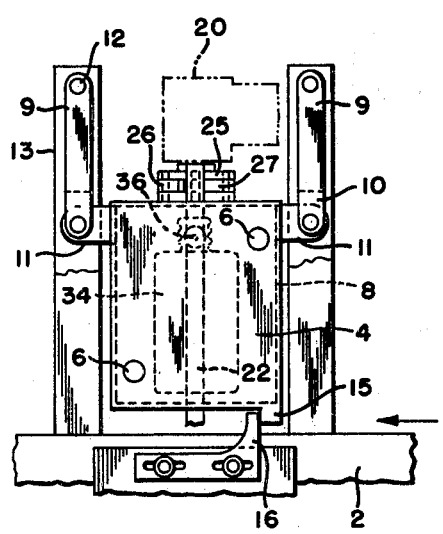
Figure 3:
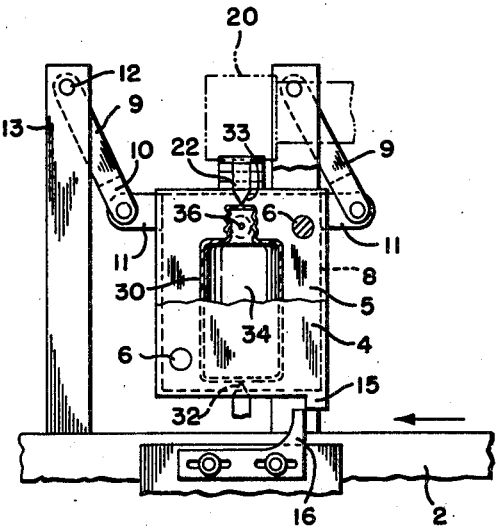

In such annexed drawing:

FIG. 1 is a partial diagramatic top plan view of a preferred form of blow molding machine constructed in accordance with this invention:

FIG. 2 is a side elevation view of one of the molds of FIG. 1 as seen from the plane of the line 2—2 thereof, with portions of the support posts for the mold broken away to show the manner of mounting the mold to the mold conveying mechanism; and FIG. 3 is a side elevation view similar to FIG. 2, but showing the relative movement that occurs between each of the molds and the conveying mechanism when the molds are momentarily halted at the extruding station.

Referring now to the details of the blow molding machine illustrated by way of example in the drawing, such blow molding machine is generally indicated at 1 and consists of a horizontal rotary table or like conveying mechanism 2 having a plurality of uniformly spaced molds 3 mounted around the periphery thereof. Each mold 3 may consist of two mold halves 4 and 5 carried by a pair of horizontal guide rods 6 which extend through apertures 7 in a support block 8. The outer mold halves 4 are fixedly attached to the guide rods 6 while the inner mold halves 5 are freely slidable thereon, for a purpose to be explained hereafter. Each support block 8 and thus the mold 3 supported thereby may be mounted for limited swinging movement above the rotary table 2 by a pair of linkages 9 having slotted lower ends 10 in which ears 11 from the support block 8 are pivotally received and having their upper ends 12 pivoted between vertical support posts 13 fixed to the rotary table 2. Accordingly, movement of the molds 3 with the rotary table 2 may be momentarily interrupted at any desired location as by engagement of a shoulder 15 on the outer mold half 4 with an adjustable stop cam 16 located adjacent the rotary table 2 during continued movement of the table 2 at a substantially constant speed. Thus, as clearly shown in FIGS. 2 and 3, the adjustable stop cam 16 will be successively halt movement of each mold 3 while the table 2 continues to rotate until the linkages 9 which are carried by the rotary table 2 through the vertical support posts 13 are swung to an extent sufficient to lift the shoulder 15 over the adjustable stop cam 16.

Such a mounting of the molds 3 on the table 2 is quite advantageous, since it permits momentary halting of the molds 3 directly below the die 20 of a stationary parison extruder 21 or other such device for feeding of a hot, soft tube or parison 22 of plastic material to the molds 3 with subsequent clamping and blow forming of the parison 22 without losing the additional time which is ordinarily required to stop the table 2 as each mold 3 passes under the extruder 21.

For opening and closing the mold halves 4 and 5, there is provided an actuator 17 which may be in the form of a rotatable member 25 carried by the support block 8 and having arms 26 and 27 pivotally connecting opposite sides of the rotatable member 25 to a cross bar 28 between the free inner ends of the guide rods 6 and the inner mold half 5, respectively. Accordingly, oscillation of the rotatable member 25 in opposite directions through actuation of a pneumatic piston-cylinder assembly 24 or the like operatively connected in conventional manner to the pivot shaft 29 for the member 25 will cause movement of the mold halves 4 and 5 toward and away from each between a closed position whereat the mold 3 is in direct alignment with the longitudinal axis of the parison 22 for proper clamping and expansion of the parison 22 into a molded article 30, and an open position for releasing the molded article.

The mold halves 4 and 5 are each provided with jaws 32, 33 adjacent opposite ends of the mold cavities 34 therein for pinching the ends of the parison 22 during closing of the mold halves. Afterwards, fluid may be supplied to the mold cavities 34 to expand the parison 22 within the mold through a hollow needle 36 which is shown extending through one of the mold halves 5 adjacent an end of its mold cavity 34 for piercing of the parison 22 during closing of the mold halves. Alternatively, a blower tube, not shown, may extend downwardly from the extruder die 20 centrally of the parison 22 for supplying such expansion fluid to the mold cavities.

In operation, the rotary table 2 is continually driven at a substantially uniform speed for successively conveying the mold 3 to the stationary parison extruder 22. As each mold 3 passes under the extruder 22 the shoulder 15 on the outer mold half 4 engages the adjustable stop cam 16 to momentarily stop movement of the mold 3, but not the table 2. While the mold 3 is stopped, a parison 22 in the form of a hot, soft tube of plastic material of any desired cross-section is extruded or otherwise supplied between the open mold halves 4 and 5, after which the mold halves are closed around the parison for pinching of the required length of tubular material and sealing of the ends thereof. During such closing, the needle 36 pierces the parison 22 interiorly of the mold cavities 34 to permit fluid to be supplied for expansion of the parison against the walls of the mold cavities.

By the time that the blowing operation has been completed, sufficient relative movement between the table 2 and interrupted mold 3 has occurred to cause raising of the mold 3 clear of the adjustable stop cam 16 for swinging of the mold 3 downwardly away from the extruder die 20 to sever the parison without smearing. Now the mold 3 continues its movement with the table 2 with the mold halves 4 and 5 closed to permit cooling of the blown article prior to ejection from the mold. As each succeeding mold 3 passes under the extruder 21, it too is stopped by the cam 16 for the subsequent feeding, clamping, piercing, and blowing operations just described.

From the foregoing, it can now be seen that the blow molding machine of the present invention is of a simple and unique construction which permits interruption of the movement of the molds for ease of parison placement, clamping and blow forming during continued movement of the mold supporting table at a substantially constant speed, whereby the substantial mass of the mold supporting table is always kept in motion.

Other modes of applying the principles of the invention may be employed, change being made as regards the details described, provided the features stated in any of the following claims or the equivalent of such be employed.

I therefore, particularly point out and distinctly claim as my invention:

1. In a machine for manufacturing molded articles and the like, a conveying mechanism adapted to be driven at a substantially uniform speed, a plurality of molds carried by said conveying mechanism for movement therewith, and means mounting each of said molds on said conveying mechanism for limited relative movement relative the conveying mechanism including means for guiding said molds in a direction essentially opposite the direction of movement of the conveying mechanism to permit interruption of the movement of said molds at a desired location for ease of insertion of mold material therewithin during continued movement of said conveying mechanism.

2. The machine of claim 1, wherein said means mounting each of said molds on said conveying mechanism for limited relative movement comprises a support block, linkage means mounting said support block for swinging movement in a substantially horizontal direction, and means mounting said molds on their respective support blocks for movement therewith.

3. The machine of claim 2, further comprising stop means located adjacent said conveying mechanism for engaging said molds at such desired location to interrupt the movement of said molds while permitting continued movement of said conveying mechanism, said molds being adapted to be gradually lifted by said linkage means during such continued movement of said conveying mechanism until said molds clear said stop means and resume their movement with said conveying mechanism.

4. The machine of claim 2, wherein said last-mentioned means comprises horizontal guide rods projecting from said support blocks for carrying said molds, said molds each consisting of two mold halves, one of said mold halves being fixedly secured to said guide rods and the other being slidable thereon toward and away from said one mold half for closing and opening of said mold halves, and means are provided on said support blocks for actuating said mold halves between such closed and open positions.

5. The machine of claim 4, wherein said guide rods slidably extend through aperaures in said support blocks, and said means for actuating said mold halves between such closed and open positions includes a rotatable member carried by said support blocks, arms pivotally connecting opposite sides of said rotatable member to said guide rods and said other slidable mold half, respectively, and means for rotating said rotatable member in opposite directions.

6. The machine of claim 4, wherein said mold halves are provided with clamping jaws at opposite ends of the mold cavities therein for pinching and sealing the ends of a plastic tube and the like extending between said mold halves during closing of said mold halves, and means are provided for introducing fluid into such mold cavities when said mold halves are closed for expanding such tube into the shape of such mold cavities.

7. In a machine for manufacturing blown hollow articles from plastic tubular material and the like, a horizontal rotary table adapted to be driven at a substantially uniform speed, a plurality of molds supported by said table at spaced apart intervals for movement therewith, each of said molds comprising two mold halves, means for opening and closing said mold halves, means mounting said molds on said table for limited relative movement relative the table to permit halting of the movement of said molds for ease of insertion of plastic tubular material between said mold halves and pinching closed the ends thereof through closing of said mold halves without disrupting the movement of said table, and means for supplying fluid to the interior of said mold halves through said tubular material for expanding the same into the shape of such interior.

8. The machine of claim 7, further comprising stop means adjacent said table for halting the movement of said molds when engaged thereby, said mold mounting means being adapted to progressively lift said molds when engaged by said stop means during continued movement of said table to clear said stop means after a predetermined amount of relative movement between said stop means and table for resumption of the movement of said molds with said table.

9. The machine of claim 8 wherein said mold mounting means comprises a support block for each mold, linkage means mounting said support blocks for swinging movement above said table, horizontal guide rods projecting from said support blocks, one of said mold halves being fixedly secured to said guide rods and the other being slidable theron toward and away from said one mold half for closing and opening of said mold halves as aforesaid, said means for opening and closing said mold halves being mounted on said support blocks for movement therewith.

10. In a machine for manufacturing molded articles and the like, a support shaft adapted to be continuously rotated during a molding operation, a plurality of circumferentially spaced molds carried by said support shaft for movement from one station to another, and means mounting said molds on said support shaft for limited relative movement with respect to said support shaft including means for guiding said molds in a direction essentially opposite the direction of rotation of the shaft to permit interruption of the movement of said molds at any one of such stations during continued rotation of such support shaft.

References Cited

UNITED STATES PATENTS 2,136,185 11/1938 Ferngren.
2,750,625 6/1956 Colombo.

WILBUR L. McBAY, Primary Examiner

U.S. Cl. X.R.

18—20; 65—264, 313; 264—98, 99